(12) United States Patent
Ivanco

(10) Patent No.: US 8,672,107 B2
(45) Date of Patent: Mar. 18, 2014

(54) COMPACT VIBRATION DAMPER

(75) Inventor: Thomas G. Ivanco, Newport News, VA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 265 days.

(21) Appl. No.: 13/042,655

(22) Filed: Mar. 8, 2011

(65) Prior Publication Data

US 2011/0220443 A1 Sep. 15, 2011

Related U.S. Application Data

(60) Provisional application No. 61/312,757, filed on Mar. 11, 2010.

(51) Int. Cl.
*F16F 7/10* (2006.01)

(52) U.S. Cl.
USPC .......................... 188/380; 464/68.3; 464/180

(58) Field of Classification Search
USPC ........ 188/380, 378, 379; 464/68.3, 68.8, 180; 267/188, 189
See application file for complete search history.

(56) References Cited

U.S. PATENT DOCUMENTS

| | | | |
|---|---|---|---|
| 3,491,857 A | 1/1970 | Reed, III | |
| 3,568,805 A | 3/1971 | Reed, III | |
| 6,019,056 A * | 2/2000 | Maeda et al. | 114/122 |
| 6,676,074 B2 * | 1/2004 | Zoppitelli et al. | 244/17.11 |
| 6,926,500 B2 * | 8/2005 | Ferullo | 416/107 |
| 7,438,165 B2 * | 10/2008 | Nerubenko | 188/380 |
| 7,862,056 B2 * | 1/2011 | Zeid et al. | 280/89 |
| 2012/0220380 A1 * | 8/2012 | Murata | 464/68.3 |

* cited by examiner

*Primary Examiner* — Pamela Rodriguez
(74) *Attorney, Agent, or Firm* — Robin W. Edwards

(57) ABSTRACT

A vibration damper includes a rigid base with a mass coupled thereto for linear movement thereon. Springs coupled to the mass compress in response to the linear movement along either of two opposing directions. A converter coupled to the mass converts the linear movement to a corresponding rotational movement. A rotary damper coupled to the converter damps the rotational movement.

16 Claims, 2 Drawing Sheets

COMPACT VIBRATION DAMPER

CROSS-REFERENCE TO RELATED PATENT APPLICATIONS

Pursuant to 35 U.S.C. §119, the benefit of priority from provisional application 61/312,757, with a filing date of Mar. 11, 2010, the contents of which are incorporated by reference herein in their entirety, is claimed for this non-provisional application.

STATEMENT REGARDING FEDERALLY SPONSORED RESEARCH OR DEVELOPMENT

This invention was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates to vibration dampers. More specifically, the invention is a compact vibration damper that can be tuned.

2. Description of the Related Art

Structural vibrations frequently need to be damped to prevent damage to a structure. To accomplish this, a standard linear damper or elastomerically-suspended masses are used. A linear damper includes a piston housed in a fluid-filled cylinder. A connecting rod couples a structure to the piston, such that structural vibrations are coupled from the rod to the piston whose linear movement is damped by the fluid in the cylinder. The problem associated with a linear damper is the space required for its construction. For example, if the damper's piston has to be capable of 2 inches of movement in either direction, the internal length of the fluid-filled cylinder would have to be at least 4 inches while the connecting rod must be at least 4 inches to span the piston's travel. This means that the overall length of the linear damper is at least 8 inches to achieve +/−2 inches of damping movement. Unfortunately, not all applications have the space to accommodate the size requirements of a linear damper. Further, tuning this type of damper typically involves changing the fluid in the cylinder. This can be a tedious and/or messy operation.

In the case of masses suspended using elastomeric materials (i.e., those whose material strain exhibits a viscous force), the allowable range of motion is severely restricted by the allowable strain of the elastomeric material. In addition, tuning of this type of damper requires a complete replacement of the elastomeric materials, which can be involved depending on their placement.

SUMMARY OF THE INVENTION

Accordingly, it is an object of the present invention to provide a vibration damper that is compact.

Another object of the present invention is to provide a vibration damper that is tunable.

Other objects and advantages of the present invention will become more obvious hereinafter in the specification and drawings.

In accordance with the present invention, a vibration damper includes a rigid base with a mass coupled thereto for linear movement thereon. A first spring coupled to the mass compresses in response to the linear movement along a first direction. A second spring coupled to the mass compresses in response to the linear movement along a second direction that is opposite to the first direction. A converter, coupled to the mass, converts the linear movement to a corresponding rotational movement. A rotary damper coupled to the converter damps the rotational movement.

DETAILED DESCRIPTION OF THE INVENTION

Figure 1:
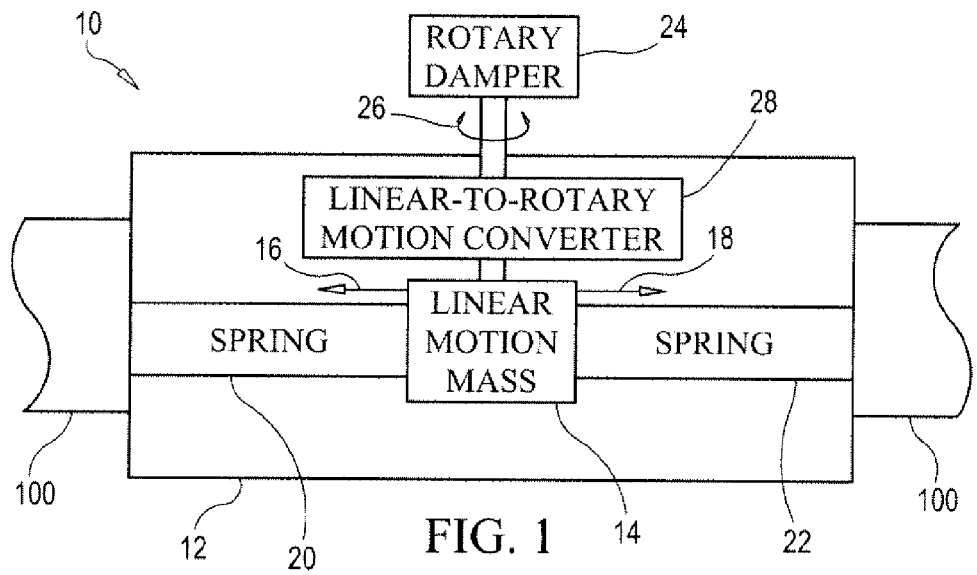
FIG. 1 is a schematic view of a vibration damper in accordance with the present invention.

Referring now to the drawings and more particularly to FIG. 1, a vibration damper according to the present invention is shown and is referenced generally by numeral 10. In general, vibration damper 10 is coupled on one or both opposing ends thereof to a structure (not shown). When that structure vibrates, damper 10 operates to quickly damp out such vibrations. The type and/or size of the structure are not limitations of the present invention. Indeed, one of the great advantages of the present invention is the compact nature thereof as compared to linear dampers, thereby allowing the present invention to be adapted for a number of applications not serviceable using current dampers. Furthermore, embodiments of the present invention will be presented that allow the vibration damper to be readily tuned to various structural vibration modes.

Vibration damper 10 includes a base 12 that is coupled on one or both (as illustrated) opposing ends thereof to a structure 100. Base 12 is constructed from a rigid material (e.g., metal, composite, etc.) such that vibrations in structure 100 are efficiently coupled to base 12. A variety of constructions of base 12 are possible without departing from the scope of the present invention. An exemplary base construction will be presented later herein.

A linear motion mass 14 is coupled to base 12 such that mass 14 is constrained to linear motion on base 12 in one of opposing directions 16 and 18 when base 12 vibrates along with structure 100. Linear displacement of mass 14 in directions 16 or 18 is opposed by a spring force applied to mass 14 by spring 20 or 22, respectively. More specifically, spring 20 compresses when mass 14 moves linearly along direction 16, while spring 22 compresses when mass 14 moves linearly along direction 18. Although not a requirement of the present invention, the spring rates of springs 20 and 22 will typically be equal or approximately equal.

The resulting linear motion of mass 14 is damped by a rotary damper 24 employing viscous damping in either of two directions of rotation. The linear motion of mass 14 and resulting linear force generated by spring 20 or 22 are converted to a rotational motion/force (indicated by two-headed arrow 26) by a linear-to-rotary motion converter 28 (e.g., a rack and pinion gear arrangement). In this way, the overall size of vibration damper 10 is essentially defined by the length of travel of mass 14 in directions 16 and 18. Damping effectiveness for a given application can be controlled by adjusting one or more of mass 14, the spring rates of springs 20 and 22, and the damping force provided by rotary damper 24.

As mentioned above, the vibration damper of the present invention can be realized by a variety of constructions without departing from the scope of the present invention. Further, the embodiments of the present invention can facilitate tuning of the vibration damper. By way of example, one such embodiment of the present invention will be explained with simultaneous reference to FIGS. 2 and 3 where the vibration damper is referenced generally by numeral 50. A rigid U-shaped bracket 52 serves as both the support for the elements of damper 50 and the mounting interface with a structure 100. More specifically, bracket 52 is defined by a flat base 52A. One or both (as illustrated) of legs 52A are rigidly coupled to structure 100 by any of a variety of ways well known in the art, the choice of which is not a limitation of the present invention. A linear rail 54 is rigidly coupled to base 52A and a movable block 56 is mounted on rail 54. Rail 54 and block 56 are configured to allow block 56 to slide along rail 54 in either of two linear directions 16 and 18 when bracket 52 vibrates along with structure 100. A variety of such slider assembles (i.e., defined by rail 54 and block 56) are known in the art.

Mounted on block 56 for movement therewith in either linear direction 16 or 18 is a housing 58. A rigid rod 60 freely passes through a passage 58A defined in housing 58 and is coupled to opposing legs 52B of bracket 52. A first compression spring 62 is disposed about rod 60 on one side of housing 58 and a second compression spring 64 is disposed about rod 58. Bracket 52 can be configured for the removal of rod 60 to facilitate the placement and changing of springs 62 and 64. Housing 58 can incorporate opposing annular regions 58B and 58C about rod 60 to receive springs 62 and 64, respectively, in their fully compressed state. Springs 62 and 64 are selected to provide a desired spring rate when tuning damper 50 for a particular application.

Tuning of damper 50 can also be achieved by adjusting the amount of mass that is subject to linear motion in linear direction 16 or 18. Accordingly, a changeable mass 66 is provided on and is coupled to housing 58 for linear movement therewith in directions 16 or 18. Mass 66 and the type of scheme used to attach mass 66 to housing 58 for easy attachment/removal are not limitations of the present invention.

Housing 58 also supports a rotary (fluid-filled or viscous) damper 68 such that rotary damper 68 moves in correspondence with the linear motion of housing 58 while also damping out such linear motion. To do this, an axle 70 is rotatably supported on one end thereof by housing 58 and is coupled on its other end thereof to a rotor (not shown) of rotary damper 68. A spur gear 72 is attached to axle 70 for rotation therewith. A linear rack gear 74 is fixedly coupled to base 52A for toothed engagement with spur gear 72. In operation, when housing 58 experiences linear motion in either direction 16 or 18 (due to vibrations in structure 100), spur gear 72 rotates (as indicated by two-headed arrow 76) via its engagement with rack gear 74. The corresponding rotation of axle 70 is transferred to the rotor of rotary damper 68 whereby such rotational motion is dampened.

Figure 2:
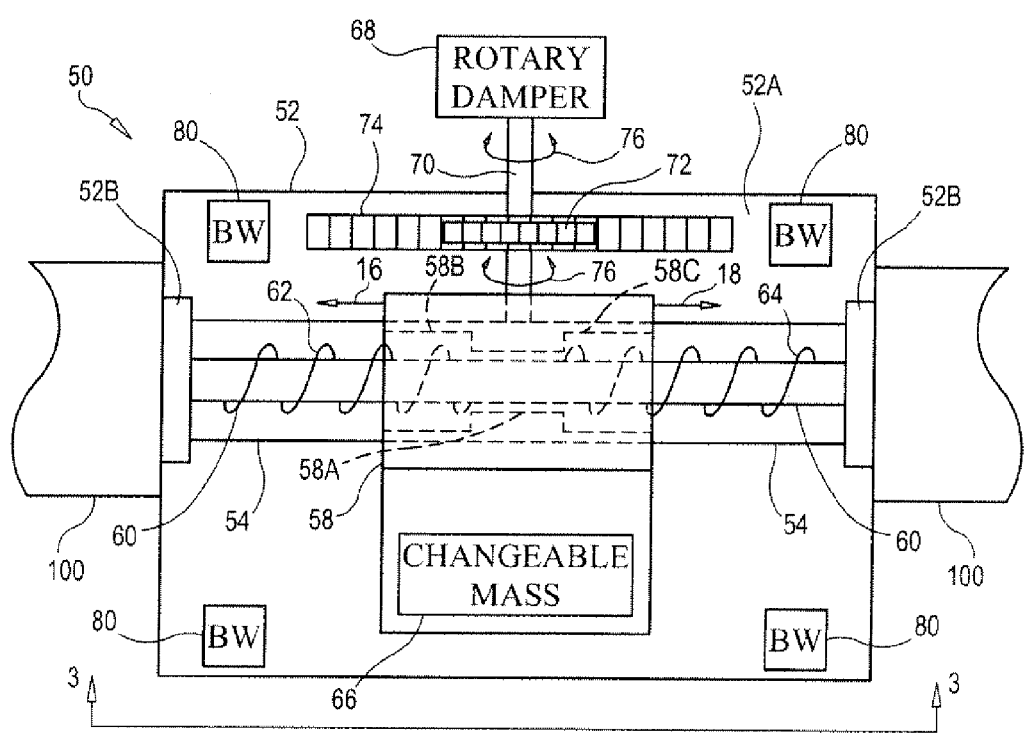
FIG. 2 is a top view of a vibration damper that is tunable in accordance with an embodiment of the present invention.
Figure 3:
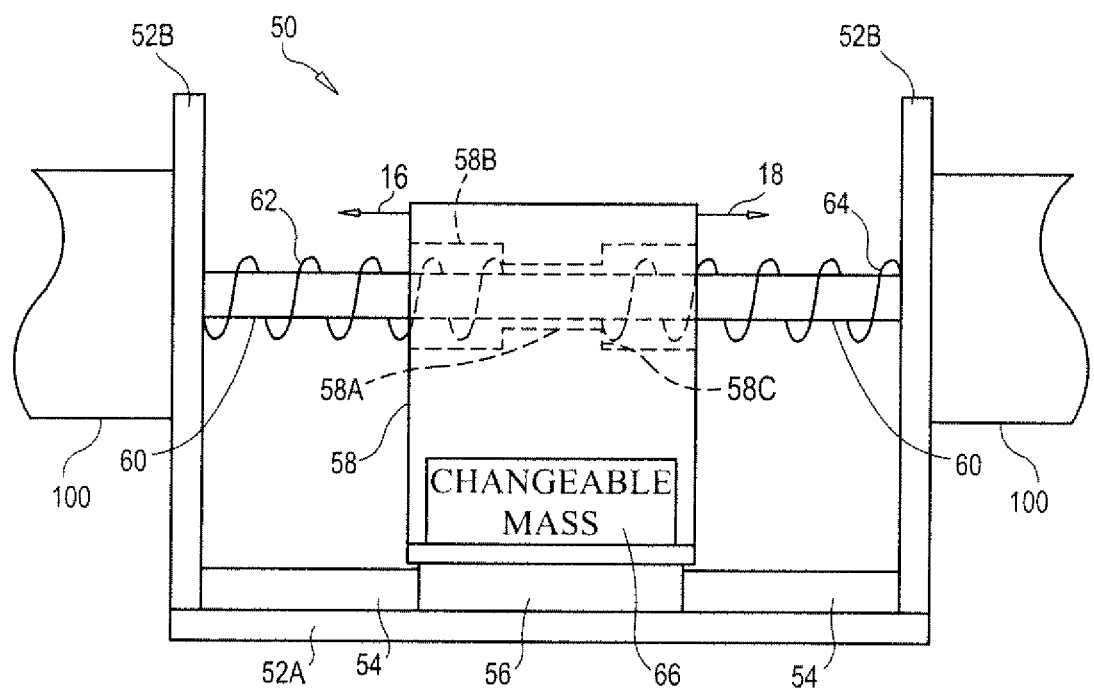
FIG. 3 is a side view of the exemplary vibration damper taken along line 3-3 in FIG. 2.

As mentioned above, tuning of damper 50 can occur through one or more of selection of springs 62 and 64, choice of mass 66, and choice of rotary damper 68. Additional tuning could also be achieved by adjusting the mass value of bracket 52. Accordingly, one or more ballast weights ("BW") 80 can be coupled to bracket 52 as illustrated in FIG. 2. Still further, resultant linear damping could also be adjusted by changing the gear ratio between spur gear 72 and rack gear 74.

The advantages of the present invention are numerous. The vibration damper combines linear displacement with rotational force damping to provide a compact design. A variety of embodiments of the vibration damper can incorporate tuning features that are easily implemented.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

The invention claimed is:

1. A vibration damper, comprising:
   a rigid base;
   a mass coupled to said base for linear movement thereon; a first spring coupled to said mass, said first spring compressing in response to said linear movement along a first direction;
   a second spring coupled to said mass, said second spring compressing in response to said linear movement along a second direction that is opposite to said first direction;
   a rotary damper; and
   a converter coupled between said mass and said rotary damper, for converting said linear movement to a corresponding rotational movement, wherein said rotational movement is damped by said rotary damper.

2. A vibration damper as in claim 1, further comprising at least one ballast weight rigidly coupled to said base.

3. A vibration damper as in claim 1, wherein said mass is adjustable in amount.

4. A vibration damper as in claim 1, wherein said first spring and said second spring have spring rates that are equal.

5. A vibration damper as in claim 1, wherein said damping provided by said rotary damper comprises viscous damping.

6. A vibration damper, comprising: a rigid base; a slider assembly including a linear rail rigidly coupled to said base and a block slidingly coupled to said linear rail wherein said block is capable of and constrained to linear movement along said linear rail; a mass coupled to said block; a first spring coupled to said base and said block, said first spring compressing in response to said linear movement along a first direction; a second spring coupled to said base and said block, said second spring compressing in response to said linear movement along a second direction that is opposite to said first direction; a converter coupled to said block for converting said linear movement to a corresponding rotational movement; and a rotary damper coupled to said converter for viscously damping said rotational movement.

7. A vibration damper as in claim 6, further comprising at least one ballast weight rigidly coupled to said base.

8. A vibration damper as in claim 6, wherein said mass is adjustable in amount.

9. A vibration damper as in claim 6, wherein said first spring and said second spring have spring rates that are equal.

10. A vibration damper, comprising:
    a rigid U-shaped bracket having opposing legs extending from a flat base;
    a slider assembly including a linear rail rigidly coupled to said flat base and a block slidingly coupled to said linear rail wherein said block is capable of and constrained to linear movement along said linear rail;
    a support housing coupled to said block wherein said linear movement of said block is imparted to said support housing;
    a mass coupled to said support housing;
    a first spring coupled between a first of said opposing legs and said one side of said support housing, said first spring compressing in response to said linear movement along a first direction; a second spring coupled between a second of said opposing legs and another side of said support housing, said second spring compressing in response to said linear movement along a second direction that is opposite to said first direction;

a converter coupled to said flat base and said support housing for converting said linear movement to a corresponding rotational movement; and a rotary damper coupled to said converter for viscously damping said rotational movement.

11. A vibration damper as in claim 10, further comprising at least one ballast weight rigidly coupled to said flat base.

12. A vibration damper as in claim 10, wherein said mass is adjustable in amount.

13. A vibration damper as in claim 10, wherein said first spring and said second spring have spring rates that are equal.

14. A vibration damper as in claim 10, further comprising a support rod fixed to each of said opposing legs and extending through said support housing wherein said support housing moves relative to said support rod during said linear movement.

15. A vibration damper as in claim 14, wherein said first spring and said second spring are disposed about said support rod.

16. A vibration damper as in claim 15, wherein said first spring and said second spring have spring rates that are equal.

* * * * *